[72] Inventor Alfred Bugay
Niagara Falls, N.Y.

[21] Appl. No. 665,566
[22] Filed Sept. 5, 1967
[45] Patented Jan. 5, 1971
[73] Assignee Sierra Research Corporation
a corporation of New York

[54] VOLTAGE SAMPLING AND FOLLOWER AMPLIFIER

1 Claim, No Drawings

[52] U.S. Cl. ........ 307/235, 328/151, 330/30, 330/38
[51] Int. Cl. ........ H03k 5/20
[50] Field of Search ........ 307/235, 251, 304; 328/151; 330/30D, 38FE

[56] References Cited

UNITED STATES PATENTS

| | | | |
|---|---|---|---|
| 3,268,827 | 8/1966 | Carlson et al. | 307/304X |
| 3,431,508 | 3/1969 | Soltz et al | 330/30D |
| 3,436,621 | 4/1969 | Crawford | 307/304 |
| 2,603,746 | 7/1952 | Burkhart et al. | 307/215X |
| 3,152,263 | 10/1964 | De Fries | 307/214X |
| 3,237,113 | 2/1966 | Klein | 328/150X |

OTHER REFERENCES

PUB I. "Analog Output with Fallback and Storage" in IBM Technical Disclosure Bulletin, Vol. 9, No. 12, May 1967, pp. 1790–91.

PUB II "Augmented D.C. Follower in Electronic Engineering" April 1967, pp. 262–63.

*Primary Examiner*—Stanley D. Miller, Jr.
*Attorney*—Alexander & Dowell

ABSTRACT: A semiconductor circuit for sampling and holding a voltage level appearing across a device which cannot be loaded without disturbing the voltage to be sampled, the illustrative circuit employing two field-effect transistors (F.E.T.), and taking advantage of their virtually-infinite input impedance characteristics to avoid loading. The first F.E.T. is connected to serve as the sampling voltage-level input, and the second F.E.T. is connected to sample the output of the circuit and to compensate for nonlinearity and temperature-sensitivity characteristics by driving, together with the first F.E.T., a differential amplifier having a high gain and a high degree of inverse feedback, the output of the differential amplifier following precisely the voltage level being sampled, but having a lower impedance characteristic which enables it to drive utilization circuits which may draw considerable currents. The charge on the storage capacitor which serves as the input device is updated by another F.E.T. serving as a switch.

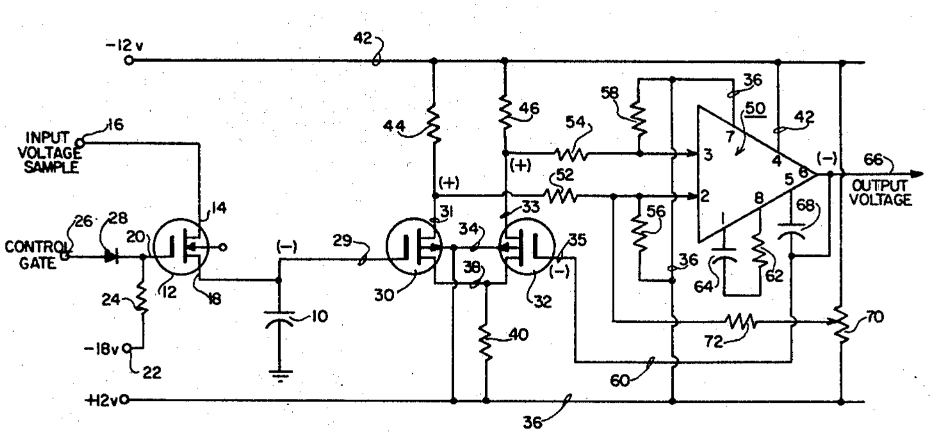

PATENTED JAN 5 1971
3,553,492
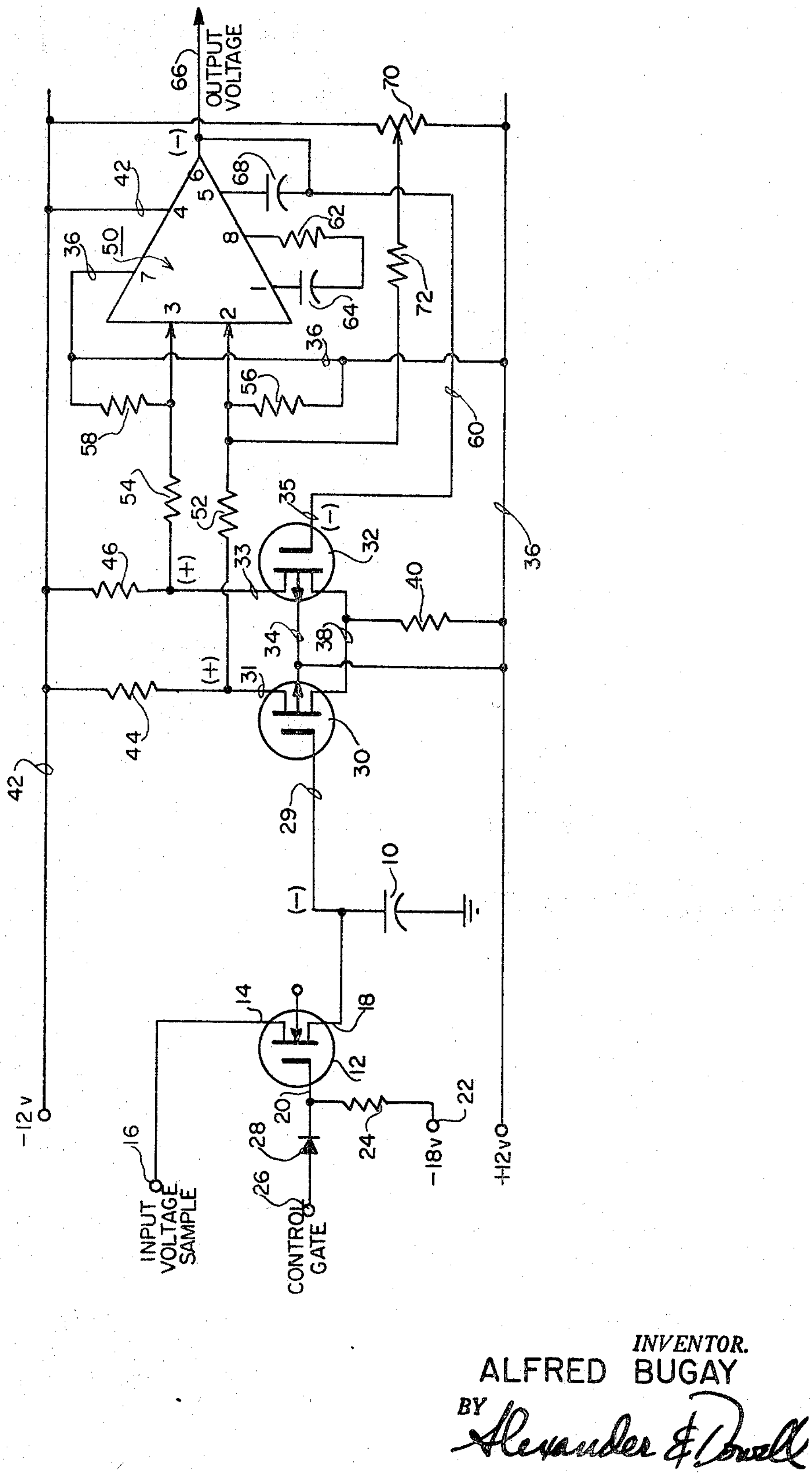
INVENTOR.
ALFRED BUGAY
BY Alexander & Dowell
ATTORNEYS

VOLTAGE SAMPLING AND FOLLOWER AMPLIFIER

This invention relates to improved solid state sample-and-hold circuits having almost infinite input impedance and having highly linear overall transfer characteristics.

It is a principal object of this invention to provide an improved insulated-gate field-effect transistor (F.E.T.) sample-and-hold circuit wherein the inherent nonlinearity of the F.E.T.'s and their high degree of temperature sensitivity are compensated to provide an overall accuracy suitable for high quality instrumentation.

It is another object principle object of the invention to provide an accurate sampling circuit as set forth above, and capable of sampling and holding both positive and negative values of voltage with respect to ground without loading the source thereof.

A further object of the invention is to provide a novel sample-and-hold circuit employing two F.E.T. amplifiers respectively feeding the inputs to a differential operational amplifier whose output is the output of the circuit and is also fed back to one of the F.E.T. amplifiers to comprise a compensating input thereto.

Other objects and advantages of the circuit will become apparent during the following discussion of the drawing which illustrates an exemplary circuit according to the present invention.

Referring now to the drawing, the voltage to be sampled and held appears across the storage capacitor 10 and is supplied to it by some switching means which can be turned on periodically to update the voltage appearing thereacross. The present illustration shows a field-effect transistor 12 serving as the switching means, and having its drain 14 connected to receive the input voltage being sampled, this voltage appearing between the terminal 16 and ground. The F.E.T. 12 has its source 18 connected to the capacitor 10, and has its gate 20 normally biased off from a source 22 of negative voltage connected to the gate 20 by a resistor 24. Thus, the F.E.T. 12 normally represents an open circuit between its drain 14 and its source 18. Gate pulses are applied to a terminal 26 and are connected through a diode 28 to the gate 20, the pulses being positive and gating the F.E.T. 12 "ON" to effectively connect the terminal 16 to the capacitor 10 whenever a positive control pulse appears at the terminal 26. Thus, the F.E.T. 12 acts as a switch for periodically connecting the input voltage to be sampled to charge the capacitor 10 to its level, and then in effect disconnecting the input terminal 16 to leave a charge on the capacitor 10 representing the "held" level of the sampled input voltage.

The circuitry to the right of the capacitor 10 represents the read-out portion of the circuit, and comprises paired F.E.T.'s 30 and 32, preferably of the type manufactured upon a common substrate represented by the line 34 and returned to the positive power supply line 36. The sources of the two F.E.T.'s are connected together by the wire 38 and are also returned to the positive supply voltage line through a resistor 40. The drains of the two F.E.T.'s are connected to the negative source of voltage 42, respectively through resistors 44 and 46, which act as load resistors for the outputs of the F.E.T. amplifiers 30 and 32. The drain 31 of the F.E.T. 30 delivers its output to terminal 02 of a differential amplifier 50, this amplifier being an integrated circuit purchased on the open market and having its terminals labeled as shown in the drawing, a suitable amplifier type being specified in the table of parts at the end of the specification. The differential amplifier 50 has two input terminals 02 and 03 and an output terminal 06 whose magnitude varies with the differential input voltages applied at 02 and 03. The drain 33 of the F.E.T. 32 provides an output which is connected to terminal 03 of the differential amplifier 50. The coupling resistors 52 and 54 serve as coupling links in voltage divider chains connected between the minus and plus power supply lines 42 and 36. One voltage divider chain has an upper intermediate terminal to which the drain of the F.E.T. 30 is connected, which chain includes resistors 44, 52 and 56. The other voltage divider chain has an upper intermediate terminal to which the drain of the F.E.T. 32 is connected, which other chain includes the resistors 46, 54 and 58. It is to be understood that the source-drain path of each F.E.T. can be connected in various different ways to provide amplification.

The gate 29 of the F.E.T. 30 is connected to continuously follow the voltage held by the capacitor 10, and since the F.E.T.'s are of the insulated-gate variety, the gate 29 draws no current from the storage capacitor 10. However, this voltage controls the potential appearing at the drain 31 of the F.E.T. 30. There is a signal polarity inversion between the gate and the drain. The voltage on the capacitor 10 can go either positive or negative with respect to ground, and assuming that a momentary negative voltage appears across the capacitor 10, the drain 31 will tend to go more positive with respect to ground, and therefore the drive at the lower intermediate terminal of the voltage divider which is connected to terminal 02 of the differential amplifier will be relatively more positive. Because of inversion in the amplifier 50 to the output at terminal 06 will go more negative, and the drive through wire 60 to the gate 35 of the F.E.T. 32 will also be more negative, thereby driving the lower intermediate terminal of the other voltage divider which is connected to input terminal 03 of the amplifier 50 more positive too. This drive acts like a negative feedback because it continuously seeks to reduce to zero the differential in input to the terminals 02 and 03. Thus, if the output voltage at 66 precisely equals the input voltage across the capacitor 10, the circuit will be perfectly balanced and no differential will exist since the voltage on input 03 will equal the voltage on input 02 of the differential amplifier 50. The amplifier 50 has a high gain for any differential level which momentarily exists between terminals 02 and 03. The particular amplifier module 50 illustrated in the drawing has adjustable frequency compensating terminals 01, 8 and 5, and suitable RC components are attached thereto as shown, including a resistor 62 and a capacitor 64 connected in series between terminals in series between terminals 01 and 08, and further including a capacitor 68 connected between output terminal 06 and compensating terminal 05. Suitable values for these compensating components are shown in the following table to cooperate with differential amplifier 50 to provide a working embodiment.

Although the F.E.T.'s 30 and 32 are pretty well matched, and although 5 percent circuit components are used thru throughout, nevertheless practical circuitry will vary somewhat from ideal conditions. Therefore, a potentiometer 70 is placed across the positive and negative voltage supply 36, 42, and the wiper of the potentiometer 70 is connected through the resistor 72 to one of the voltage divider chains in the drain circuits of the F.E.T.'s 30 and 32. This potentiometer 70 is used to zero adjust the output 66 when the upper terminal of capacitor 10 is grounded, representing zero input voltage to the circuit.

As mentioned above in the specification, F.E.T.'s suffer from two difficulties, namely nonlinearity of response, and temperature sensitivity. The latter is the reason why the two F.E.T.'s 30 and 32 are preferably mounted upon the same substrate 34 and are connected in a compensating circuit with the differential amplifier 50,. As long as the inputs to the amplifier 50 provide an output on wire 66 which is precisely equal to the input voltage to the gate 29 of the F.E.T. 30, the drive upon the gate 35 of the F.E.T. 32 will be the same magnitude and polarity as the drive from the capacitor 10, and therefore the input to terminal 03 of the differential amplifier 50 will be identical to the drive on terminal 02. On the other hand, if an error appears and the output on the wire 66 differs in magnitude or polarity from the input to the gate 29 of the transistor 30, the drive to the F.E.T. 32 will be different, and therefore a differential will exist between terminal 02 and terminal 03, and the output voltage 66 will adjust in a direction to remove the differential. This action of the differential amplifier will eliminate not only nonlinearities in the amplification of the F.E.T.'s, but in addition will eliminate variations caused by temperature changes, the present circuit being relatively insensitive to temperature changes because the amplification of both F.E.T.'s 30 and 32 will be similarly affected by changes in their temperature. The common connection of the sources at 38 to the common resistor 40 provides an additional degree of inverse feedback to the F.E.T.'s 30 and 32 to further match their gains.

Typical satisfactory circuit components are shown in the following table:

| | | |
|---|---|---|
| F.E.T. 12 | | 2N4351 |
| F.E.T.s 30 and 32 | | 2N3609 |
| Resistors 24, 40, 44, 46, 52, 54 | | 100k |
| Resistors 56, 58 | | 250k |
| Resistor 62 | | 1.5k |
| Resistor 72 | | 1k |
| Potentiometer 70 | | 100k |
| Capacitor 10 | mfd. | .1 |
| Capacitor 64 | mfd. | .01 |
| Capacitor 68 | mfd. | .001 |
| Differential amplifier 50 (Fairchild) | | μA709C |

This invention is not to be limited to the exact form shown in the drawing, for obviously changes can be made within the scope of the following claims.

I claim:

1. A circuit for sampling without loading an input voltage and for delivering an output voltage precisely matching the level of said input voltage, comprising:

a. plus and minus power supply means;

b. first and second field-effect transistors, each having a gate, and a source and drain path, the gate of the first transistor being connected to receive said input voltage;

c. differential amplifier means having two input terminals and an output delivering said output voltage;

d. coupling means comprising similar separate voltage divider means having end terminals connected across said power supply means and each having upper and lower intermediate terminals, the upper terminals being respectively connected to be driven by the source and drain paths of said transistors and the lower intermediate terminals being respectively connected to drive the respective input terminals of the differential amplifier means;

e. means directly coupling the output of the differential amplifier means to the gate of the second transistor; and f. potentiometer means connected across said power supply means having a tap, and a resistor connected between said tap and the lower intermediate terminal of one of said voltage divider means, the tap on the potentiometer being adjustable to make the output voltage of the differential amplifier means equal to zero when said input voltage equals zero.